US011396167B2

(12) United States Patent
Fukugami et al.

(10) Patent No.: US 11,396,167 B2
(45) Date of Patent: Jul. 26, 2022

(54) LAMINATE AND METHOD FOR PRODUCING LAMINATE

(71) Applicant: TOPPAN PRINTING CO., LTD., Tokyo (JP)

(72) Inventors: Miki Fukugami, Tokyo (JP); Toshiya Ishii, Tokyo (JP); Tomoko Ooki, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/935,377

(22) Filed: Jul. 22, 2020

(65) Prior Publication Data
US 2020/0346443 A1 Nov. 5, 2020

Related U.S. Application Data

(63) Continuation of application No. PCT/JP2019/003017, filed on Jan. 29, 2019.

(30) Foreign Application Priority Data

Jan. 31, 2018 (JP) .............................. JP2018-014729
Jun. 20, 2018 (JP) .............................. JP2018-116918

(51) Int. Cl.
*B32B 27/16* (2006.01)
*B32B 27/08* (2006.01)
(Continued)

(52) U.S. Cl.
CPC .............. *B32B 27/16* (2013.01); *B32B 27/08* (2013.01); *B32B 27/32* (2013.01); *B32B 27/36* (2013.01);
(Continued)

(58) Field of Classification Search
None
See application file for complete search history.

(56) References Cited

U.S. PATENT DOCUMENTS 7,253,008 B2 * 8/2007 Rucker ................ G01N 33/543
436/501
2009/0181244 A1 * 7/2009 Fukugami ............... B32B 27/30
428/336
(Continued)

FOREIGN PATENT DOCUMENTS

JP 2002-192675 A 7/2002
JP 2004-169174 A * 6/2004
(Continued)

OTHER PUBLICATIONS

International Searching Authority, "International Search Report," issued in connection with International Patent Application No. PCT/JP2019/003017, dated Apr. 16, 2019.
(Continued)

*Primary Examiner* — Vivian Chen
(74) *Attorney, Agent, or Firm* — Foley & Lardner LLP

(57) ABSTRACT

A method for producing a laminate, the method comprising at least a pretreatment step of pretreating a surface of a substrate made of a plastic film by reactive ion etching so that the maximum displacement of the substrate surface measured by local thermal analysis is 300 nm or more, and a lamination step of laminating a thermoplastic resin layer made of a material different from that of the substrate on the pretreated surface of the substrate; wherein the plastic film is a polyethylene terephthalate film.

3 Claims, 1 Drawing Sheet

(51) Int. Cl.
- *B32B 27/32* (2006.01)
- *B32B 27/36* (2006.01)
- *B29C 43/30* (2006.01)
- *B32B 37/16* (2006.01)
- *B32B 38/00* (2006.01)
- *B29C 43/20* (2006.01)
- *B29C 59/14* (2006.01)
- *B32B 38/10* (2006.01)

(52) U.S. Cl.
CPC .............. *B29C 43/20* (2013.01); *B29C 43/30* (2013.01); *B29C 59/14* (2013.01); *B32B 37/16* (2013.01); *B32B 38/0008* (2013.01); *B32B 38/0012* (2013.01); *B32B 38/10* (2013.01); *B32B 2250/02* (2013.01); *B32B 2250/24* (2013.01); *B32B 2310/14* (2013.01); *B32B 2367/00* (2013.01); *B32B 2439/70* (2013.01); *B32B 2439/80* (2013.01); *Y10T 428/31786* (2015.04)

(56) References Cited

U.S. PATENT DOCUMENTS

| | | | |
|---|---|---|---|
| 2012/0288676 A1* | 11/2012 | Sondergard | C03C 14/004 428/141 |
| 2018/0124926 A1* | 5/2018 | Modi | H05K 3/1216 |
| 2020/0331024 A1* | 10/2020 | Okamura | C23C 14/022 |
| 2021/0339926 A1* | 11/2021 | Okamura | B32B 27/32 |

FOREIGN PATENT DOCUMENTS

| | | | |
|---|---|---|---|
| JP | 2018-065376 A | * | 4/2018 |
| JP | 2018-065376 A | | 4/2018 |
| WO | WO-2008/029733 A1 | | 3/2008 |

OTHER PUBLICATIONS

International Searching Authority, "Written Opinion," issued in connection with International Patent Application No. PCT/JP2019/003017, dated Apr. 16, 2019.

* cited by examiner

LAMINATE AND METHOD FOR PRODUCING LAMINATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/003017, filed on Jan. 29, 2019, which is based upon and claims the benefit of priority to Japanese Patent Applications Nos. 2018-014729, filed on Jan. 31, 2018; and, 2018-116918, filed Jun. 20, 2018, the disclosures of which are all incorporated herein by reference in their entireties.

BACKGROUND

Technical Field

The present invention relates to a laminate and a method for producing a laminate.

Background Art

In laminates used for food packaging, medical pharmaceutical packaging, and electronic component packaging, in order to improve the adhesion between resin layers made of resin, there is a known method in which corona treatment is applied to the resin layer surfaces (PTL 1).

PTL 1 indicates that in the production of a laminate containing a gas barrier layer, after corona treatment is performed on a polyester film surface, an adhesive resin is laminated on this surface to increase the adhesive strength; and that conventional adhesives are not required.

CITATION LIST

Patent Literature

PTL 1: JP 2002-192675 A

SUMMARY OF THE INVENTION

Technical Problem

However, in the above method, when an attempt is made to laminate a thermoplastic resin made of a material different from that of a plastic film as a substrate, for example, by an extrusion lamination method on the substrate film, there is a possibility that sufficient adhesion between them is not obtained by the corona treatment applied to the surface of the plastic film. For this reason, in order to achieve stronger adhesion between the substrate film and the thermoplastic resin, and to obtain a laminate with improved or even excellent mechanical properties, it is necessary to consider a new treatment technique that can replace corona treatment.

The present invention was made in view of such circumstances. An object of the present invention is to provide a method for producing a laminate, the method being capable of obtaining a laminate having improved or even excellent adhesion strength and mechanical properties. Another object of the present invention is to provide a laminate produced by such a production method.

Solution to Problem

As a result of extensive studies, the present inventors found that in order to achieve the above objects, it is extremely important to perform reactive ion etching treatment on the surface of a substrate made of a plastic film under predetermined conditions, and to appropriately adjust the maximum displacement of the surface of the plastic film substrate in the laminate. The maximum displacement is measured by local thermal analysis (LTA).

More specifically, the maximum displacement can be measured by bringing the probe of an analyzer into contact with the substrate surface, and analyzing the behavior when a voltage is applied to the probe to heat the substrate surface. At this time, the present inventors found that if the maximum displacement was not an appropriate value, the adhesion between the substrate and the thermoplastic resin layer was likely to decrease. The present invention is thus provided.

The present invention provides a method for producing a laminate, the method comprising at least a pretreatment step of pretreating a surface of a substrate made of a plastic film by reactive ion etching so that the maximum displacement of the substrate surface measured by local thermal analysis is 300 nm or more, and a lamination step of laminating a thermoplastic resin layer made of a material different from that of the substrate on the pretreated surface of the substrate; wherein the plastic film is a polyethylene terephthalate film.

According to the present invention, there is provided a laminate having improved or even excellent mechanical properties, in which a substrate and a thermoplastic resin layer are firmly bonded to each other. Compared with a conventional production method using a resin-based anchor coat agent, in the laminate obtained by the production method of the present invention, peeling and deterioration do not occur on the substrate surface layer. Therefore, the laminate of the present invention has improved or even excellent durability against external forces, such as tension, compression, and shearing. Even when subjected to treatment unique to packaging materials, such as retort treatment and boiling treatment, the laminate of the present invention can appropriately store its contents. That is, the production method of the present invention makes it possible to obtain a laminate having improved or even excellent adhesion and mechanical properties.

In the production method of the present invention, the pretreatment step may be performed so that the softening temperature of the substrate surface measured by local thermal analysis is 250° C. or higher.

In the production method of the present invention, when the substrate and the thermoplastic resin layer in the laminate are peeled in a wet state, the difference C between the carbon concentration of the peeled surface of the substrate and the carbon concentration of the peeled surface of the thermoplastic resin layer after peeling may satisfy the following formula (A) in measurement by X-ray photoelectron spectroscopy (XPS):

$$0 \leq |C| \leq 10 \text{ (atomic \%)} \qquad \text{Formula (A)}$$

The present invention also provides a laminate comprising a substrate made of a plastic film, and a thermoplastic resin layer on the substrate; wherein the thermoplastic resin layer is made of a material different from the material constituting the substrate, and when the substrate and the thermoplastic resin layer are peeled in a wet state, the difference C between the carbon concentration of the peeled surface of the substrate and the carbon concentration of the peeled surface of the thermoplastic resin layer after peeling satisfies the following formula (A) in measurement by X-ray photoelectron spectroscopy (XPS):

$$0 \leq |C| \leq 10 \text{ (atomic \%)} \quad \text{Formula (A)}$$

In the laminate of the present invention, the plastic film may be a polyethylene terephthalate film, and the maximum displacement of the surface of the substrate on a side facing the thermoplastic resin layer may be 300 nm or more, the maximum displacement being measured by local thermal analysis.

In the laminate of the present invention, the wet laminate strength between the substrate and the thermoplastic resin layer may be 1.5 N/15 mm or more.

Further, the present invention provides a laminate comprising a substrate made of a plastic film, and a thermoplastic resin layer on the substrate; wherein the plastic film is a polyethylene terephthalate film, and the maximum displacement of the surface of the substrate on a side facing the thermoplastic resin layer is 300 nm or more, the maximum displacement being measured by local thermal analysis.

In the laminate of the present invention, the softening temperature of the surface of the substrate on the side facing the thermoplastic resin layer may be 250° C. or higher, the softening temperature being measured by local thermal analysis. Thus, the mechanical properties of the gas barrier laminate can be further improved.

Advantageous Effects of the Invention

According to the present invention, a laminate having improved or even excellent mechanical properties can be provided. The laminate of the present invention can suppress decrease in the adhesion between the substrate and the thermoplastic resin layer even when, for example, retort treatment or boiling treatment is performed.

The laminate of the present invention has improved or even excellent filling and packaging suitability, storage suitability, protection suitability, etc., for foods and drinks, pharmaceuticals, electronic device components, and the like. The use of the laminate of the present invention is not limited to the above-mentioned fields; it can be applied to various fields according to the required properties.

DETAILED DESCRIPTION

Figure 1A:
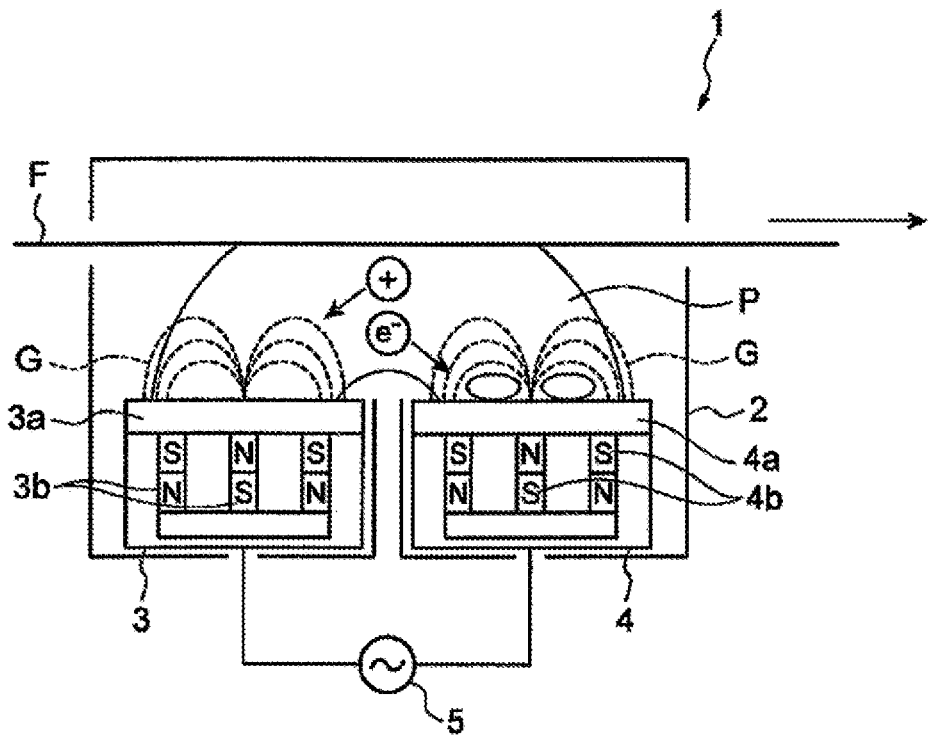
FIGS. 1(a) and 1(b) are cross-sectional views schematically showing a film processing apparatus used in reactive ion etching treatment.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

<Laminate>

The laminate comprises a substrate made of a plastic film, and a thermoplastic resin layer on the substrate.

(Substrate)

As the plastic film that constitutes the substrate, those generally used as substrates for laminates can be used. Examples include polyester films, such as polyethylene terephthalate (PET) and polyethylene naphthalate (PEN); polyolefin films, such as polyethylene and polypropylene; polystyrene films, polyamide films, polycarbonate films, polyacrylonitrile films, polyimide films, and the like. Among these, those having mechanical strength and dimensional stability are preferable. From such a viewpoint, polyethylene terephthalate films, polyamide films, and polypropylene films are preferably used. These films may be stretched or unstretched.

In consideration of suitability as packaging materials, for example, the substrate may be made of any one of the above single films, or a plurality of films in combination. The substrate may be made of, for example, a polyethylene terephthalate film. Transparent polyethylene terephthalate films are preferable, from the viewpoint of use as packing materials. Although the polyethylene terephthalate film may be stretched or unstretched, the film is preferably stretched, from the viewpoint of mechanical strength and dimensional stability.

The thickness of the substrate is not particularly limited; however, taking into consideration the processability in the case of forming a thermoplastic resin layer by extrusion lamination, the thickness is practically preferably 3 to 200 µm more preferably 6 to 50 µm, and even more preferably 6 to 30 µm. If the thickness is less than 3 µm, wrinkle formation and film fracture are likely to occur during treatment with a winding device. In contrast, if the thickness is more than 200 µm, the flexibility of the film decreases; thus, treatment with a winding device is likely to become difficult.

Further, well-known various additives and stabilizers (e.g., antistatic agents, ultraviolet inhibitors, plasticizers, and lubricants) may be attached to the surface of the substrate opposite to the surface on which the thermoplastic resin layer is provided. Moreover, this surface may be subjected to corona treatment, plasma processing, or the like. Further, on this surface, other layers, such as an inorganic oxide-deposited layer, a metal-deposited layer, a coating layer, and a print layer, may be provided singly or in combination of two or more. For example, the substrate provided with an inorganic oxide-deposited layer and a metal-deposited layer can function as a gas barrier film. Other layers can be formed on the above plastic films using various methods, such as dry lamination and extrusion lamination.

(Thermoplastic Resin Layer)

The resin that constitutes the thermoplastic resin layer is not particularly limited as long as it can be laminated on the substrate. Examples thereof include low-density polyethylene, high-density polyethylene, medium-density polyethylene, an ethylene-vinyl acetate copolymer, an ethylene-α-olefin copolymer, an ethylene-α,β-unsaturated carboxylic acid copolymer or an esterified or ion-crosslinked product thereof, polypropylene, a propylene-α-olefin copolymer, acid anhydride-modified polyolefin, epoxy-modified polyolefin, and similar resins. These may be used singly or in combination of two or more.

The thickness of the thermoplastic resin layer is preferably 5 to 200 μm, and more preferably 5 to 100 μm. When the thickness is less than 5 μm, for example, it tends to be difficult to extrude a thermoplastic resin layer with a uniform thickness during extrusion lamination. Moreover, when the thickness is greater than 200 μm, for example, when a thermoplastic resin layer is heat-sealed, heat sealing strength is likely to decrease; thus the physical properties as a laminate tend to decrease.

The thermoplastic resin layer may contain, within a range that does not impair the adhesion to the substrate, additives, such as slipping agents, antistatic agents, antifogging agents, ultraviolet absorbers, and antioxidants; inorganic fillers, such as silica and titanium oxide; and the like.

The thermoplastic resin layer can be made of a material different from the material constituting the substrate. Examples of suitable combinations of the constituent materials of the substrate and the thermoplastic resin layer include a combination of polyethylene terephthalate or polyamide, and low-density polyethylene, an ethylene-α-olefin copolymer, polypropylene, or acid anhydride-modified polyolefin; a combination of polypropylene, and low-density polyethylene, an ethylene-α-olefin copolymer, or acid anhydride-modified polyethylene; and the like.

In the laminate of the present invention, the maximum displacement of the surface of the substrate (in particular, a polyethylene terephthalate film) on a side facing the thermoplastic resin layer is 300 nm or more, the maximum displacement being measured by local thermal analysis. Improved or even excellent adhesion can be thereby exhibited between the substrate and the thermoplastic resin layer. From this viewpoint, the maximum displacement is preferably 320 nm or more, more preferably 350 nm or more, and even more preferably 400 nm or more.

The upper limit of the maximum displacement is not particularly limited. However, excessive treatment by reactive ion etching, described later, tends to reduce the maximum displacement and to degrade the adhesion; thus, the upper limit of the maximum displacement can be set to 600 nm, for example.

The softening temperature of the surface of the substrate on a side facing the thermoplastic resin is preferably 250° C. or higher, the softening temperature being measured by local thermal analysis. The adhesion between the substrate and the thermoplastic resin can be thereby further improved. From this viewpoint, the softening temperature is more preferably higher than 250° C., and even more preferably 255° C. or higher.

The upper limit of the softening temperature is not particularly limited. However, excessive treatment by reactive ion etching, described later, tends to reduce the softening temperature and to degrade the adhesion; thus, the upper limit of the softening temperature can be set to 270° C., for example.

The method for measuring the maximum displacement and softening temperature of the substrate surface is most suitably local thermal analysis, as described above. This method has less variance. Therefore, the maximum displacement and the softening temperature can be measured almost exactly.

The maximum displacement and softening temperature of the substrate surface can be adjusted by changing the conditions of reactive ion etching on the substrate. In the sense that the physical properties of the outermost surface layer of the substrate are appropriately adjusted, it can also be said that a layer treated by reactive ion etching is formed on the substrate.

For example, when reactive ion etching treatment is not performed, the maximum displacement of the surface of a polyethylene terephthalate film is 50 nm, and the softening temperature is 248° C. It is presumed that due to the reactive ion etching treatment, the surface layer of the polyethylene terephthalate film has strong cohesive force and becomes flexible, thereby preventing adhesion reduction due to retort treatment or boiling treatment.

When the substrate and thermoplastic resin layer of the laminate of the present embodiment are peeled while wetting them with water, that is, when the substrate and thermoplastic resin layer are peeled in a wet state, the difference C between the carbon concentration of the peeled surface of the substrate and the carbon concentration of the peeled surface of the thermoplastic resin layer after peeling satisfies the following formula (A) in measurement by X-ray photoelectron spectroscopy (XPS):

$$0 \leq |C| \leq 10 \text{ (atomic \%)} \quad \text{Formula (A)}$$

The measurement by X-ray photoelectron spectroscopy (XPS) can analyze the type and concentration of atoms in a region with a depth of several nanometers from the surface of a substance to be measured, the type of atom bonded to that atom, their bonding state, and the like. In this case, attention is paid to carbon atoms. As described above, the substrate and thermoplastic resin layer of the laminate are peeled while wetting them with water, and the peeled surfaces are then measured by XPS (X-ray source: MgKα, output: 100 W). Then, the carbon concentration (atomic %) of each surface is analyzed quantitatively. Peeling can be carried out in the same manner as in the measurement of wet laminate strength described later. A laminate in which the absolute value of the difference in the carbon concentration between both surfaces determined by quantitative analysis satisfies the above formula (A) can be considered to have improved or even excellent adhesion between the substrate and the thermoplastic resin layer. That is, such a laminate is considered to have improved or even excellent mechanical properties. From such a viewpoint, the difference C preferably satisfies $|C| \leq 9$ atomic %, and may satisfy $|C| \leq 8$ atomic % or $|C| \leq 7$ atomic %. The difference C particularly preferably satisfies $|C| \leq 2$ atomic %. According to the finding of the inventors, when $|C|$ is more than 10 atomic %, peeling tends to occur in the vicinity of the interface between the substrate and the thermoplastic resin layer. This peeling is not preferable, because the adhesion between these two layers is not sufficient, thereby causing poor adhesion and delamination.

In the laminate that satisfies the above formula (A), the wet laminate strength between the substrate and the thermoplastic resin layer is preferably 1.5 N/15 mm or more, and more preferably 2.5 N/15 mm or more. When the wet laminate strength is 1.5 N/15 mm or more, improved or even excellent adhesion is likely to be exhibited between the substrate and the thermoplastic resin layer. In contrast, the upper limit of the wet laminate strength is not particularly limited, and can be generally set to 15 N/15 mm or less.

The wet laminate strength between the substrate and the thermoplastic resin layer can be measured, for example, according to JIS Z1707 using a Tensilon universal testing machine RTC-1250 (produced by Orientec Co., Ltd.), while wetting the measurement site with water.

The |C| value and the wet laminate strength can be adjusted by changing the maximum displacement and softening temperature of the substrate surface. More specifically, they can be adjusted by changing the treatment conditions of reactive ion etching described later, the constitutional materials of the substrate and thermoplastic resin layer, and the like.

<Method For Producing Laminate>

The method for producing a laminate comprises at least a pretreatment step of pretreating the surface of a substrate made of a plastic film by reactive ion etching under predetermined conditions, and a lamination step of laminating a thermoplastic resin layer made of a material different from that of the substrate by extrusion lamination on the pretreated surface of the substrate. The predetermined conditions of reactive ion etching can be such that the maximum displacement of the substrate surface measured by local thermal analysis is 300 nm or more. The conditions may also be such that the softening temperature of the substrate surface measured by local thermal analysis is 250° C. or higher. The following describes an example of the apparatus and conditions used for reactive ion etching.

(Treatment Step)

Figure 1B:
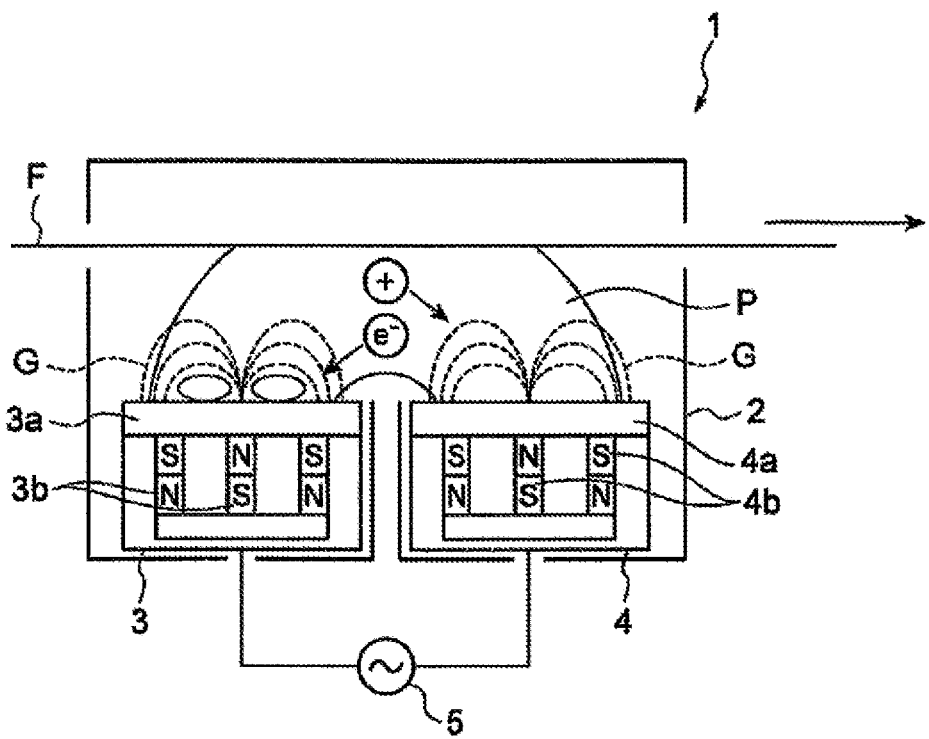

FIGS. 1(a) and 1(b) are cross-sectional views schematically showing a film processing apparatus (plasma processing apparatus) used in reactive ion etching treatment (plasma processing).

As shown in FIGS. 1(a) and 1(b), the film processing apparatus 1 is, for example, a magnetron plasma processing apparatus that is arranged in a vacuum apparatus and that applies an AC voltage to two magnetron cathodes so that they mutually discharge. The film processing apparatus 1 comprises a box 2, a first discharge electrode unit 3 and a second discharge electrode unit 4 that are arranged in parallel in the box 2, and an AC power source 5 electrically connected to the first discharge electrode unit 3 and the second discharge electrode unit 4.

A film F to be processed (corresponding to the substrate made of a plastic film) is inserted into the film processing apparatus 1, and is subjected to surface treatment using a plasma P generated inside the apparatus.

The magnetron plasma processing apparatus is an apparatus that performs ion etching and the like (including amorphization of a substrate surface, a change in functional group, and the like) by producing a magnetic field G using magnets (S-pole, N-pole) arranged on back surfaces of electrodes and generating a high-density plasma.

By performing such treatment, the state of the substrate surface can be adjusted using the generated radicals or ions. The electrodes of the first discharge electrode unit 3 and second discharge electrode unit 4 are arranged in parallel in a direction (TD, referred to as the "film width direction," a direction orthogonal to the plane in FIGS. 1(a) and 1(b)) orthogonal to a film F feeding direction (MD, a horizontal direction (arrow direction) in FIGS. 1(a) and 1(b)). Since the electrode width in the film width direction is designed to be equal to or greater than the width of the film F, the entire surface of the film can be uniformly treated.

For example, the plate-shaped electrodes 3a and 4a are composed of stainless steel, but may be composed of metal such as aluminum (Al), titanium (Ti), niobium (Nb), tantalum (Ta), or zirconium (Zr). Moreover, the magnet 3b and the magnet 4b are composed of a plurality of permanent magnets having a pair of S and N poles (e.g., neodymium magnets). The adjacent magnets have different magnetization directions. Thus, a magnetic field G can be formed in the space, and a high-density plasma can be generated.

The AC power source 5 is a plasma generation power source for supplying a predetermined high-frequency power to the first discharge electrode unit 3 and the second discharge electrode unit 4. By supplying high-frequency AC power from the AC power source 5 to the first discharge electrode unit 3 and the second discharge electrode unit 4, a state is formed in which one discharge electrode unit is a cathode, the other discharge electrode unit is an anode, and charged particles move back and forth between the first discharge electrode unit 3 and the second discharge electrode unit 4 (see FIGS. 1 (a) and (b)).

That is, in FIG. 1 (a), the first discharge electrode unit 3 on the left side of the figure is a cathode (negative electrode), and the second discharge electrode unit 4 on the right side is an anode (positive electrode). Charged particles represented by (+) are guided to the cathode side, and electrons represented by (e⁻) are guided to the anode side. In FIG. 1 (b), the anode side and the cathode side are opposite, and the charged particles and the electrons are guided in directions opposite to FIG. 1(a).

Thus, magnetron discharge is alternately performed from the first discharge electrode unit 3 and the second discharge electrode unit 4 using a high-frequency signal from the AC power source 5.

The high-frequency power supplied from the AC power source 5 is, for example, 3 kW or more. From the viewpoint that the maximum displacement and softening temperature of the substrate surface are adjusted within the desired ranges, in the film processing apparatus 1, the AC power source 5 can supply a predetermined power to the first discharge electrode unit 3 and the second discharge electrode unit 4 so that the electrode width (the electrode length in the feeding direction) and the processing intensity Epd per processing speed used for plasma processing are preferably 100 [W·s/m²] or more, and more preferably 400 [W·s/m²] or more. Since excessive reactive ion etching may promote the carbonization of the substrate surface and cause an adhesion-inhibiting factor, the upper limit of the plasma processing intensity can be set to 900 [W·s/m²] or less, for example.

"Epd" can be expressed by the following equation (1) or (2), where the treatment power [W] represents power from the AC power source 5, the electrode width [m] in the film F feeding direction/electrode area [m²] represents the electrode width/electrode area of the discharge electrode unit, and the processing speed [m/s] represents the conveying speed of the film to be processed.

[Equation 1]

$$Epd\ [\text{W} \cdot \text{s/m}^2] = \frac{\text{Treatment power [W]} \times \text{electrode width (in film feeding direction) [m]}/\text{processing speed [m/s]}}{\text{Electrode area [m}^2\text{]}} \quad (1)$$

$$= \frac{\text{Treatment power [W]}}{\text{Electrode width (in film width direction) [m]} \times \text{processing speed [m/s]}} \quad (2)$$

The electrode areas in equations (1) and (2) refer to the cathode electrode area, but the cathode electrode is alternately switched between the electrodes 3a and 4a due to the application of an AC voltage. Accordingly, the electrode area is equal to an area obtained by adding the areas of the two electrodes and dividing the result by two. When the electrodes 3a and 4a have the same shape, the electrode area is equal to the area of one of the electrodes 3a and 4a.

Moreover, the frequency of the high-frequency power supplied from the AC power source 5 is preferably 1 kHz to 400 kHz, and more preferably 10 kHz to 100 kHz, from the viewpoint that the maximum displacement and softening temperature of the substrate surface are adjusted within the desired ranges.

A large voltage drop occurs on the magnetron electrode surface side, and a lower voltage drop occurs on the surface (the lower surface in the figure) side of the film F. However, according to the film processing apparatus 1, a higher power can be supplied to each discharge electrode unit by pole switching treatment by alternating current, and a plasma is generated in a bridge shape so as to approach the film F due to the magnetic field G generated by the magnets. Thus, the processing intensity for the surface of the film F can be increased.

For example, one or more inert gases, composed of argon (Ar), helium (He), or nitrogen (N), are introduced into the box 2 of the film processing apparatus 1. The inert gas to be introduced is preferably argon gas, which is a noble gas. In this case, gas having high reactivity such as oxygen ($O_2$) may also be introduced. The pressure in the box 2 is adjusted to 0.1 Pa or more and less than 50 Pa, for example.

The film F passes through the inside of the box 2 at a predetermined conveying speed, whereby reactive ion etching treatment is performed on the surface of the film F to be treated. The conveying speed of the film F is, for example, 2 m/s to 20 m/s, from the viewpoint that the maximum displacement and softening temperature of the substrate surface are adjusted within the desired ranges.

By such treatment, for example, it is possible to perform pretreatment (adhesion treatment) for lamination (including bonding and the like) of another film, or to perform pretreatment (adhesion treatment) for vapor deposition, by breaking down the crystal structure of the surface of the film F so that the crystal structure becomes amorphous. The film F may be repeatedly subjected to the plasma processing described above (e.g., the same treatment may be repeated two to three times). This treatment may also be performed on both surfaces of the film F. Further, corona treatment or the like may be performed on the surface of the film F before the above treatment.

(Lamination Step)

Because a thermoplastic resin layer is laminated on a substrate pretreated by reactive ion etching under predetermined conditions, the adhesion between the substrate and the thermoplastic resin layer can be enhanced. This step is preferably performed by extruding a melted thermoplastic resin by extrusion lamination on the substrate. The extrusion temperature during extrusion lamination is not particularly limited, and may be suitably set depending on the thermoplastic resin used. The thermoplastic resin used in this step is a material that is different from the material constituting the substrate. As a result of this step, for example, a low-density polyethylene resin (LDPE) is laminated by extrusion lamination on the reactive ion-etched surface of the polyethylene terephthalate film.

The thermoplastic resin may be extruded simultaneously with other thermoplastic resins. That is, the thermoplastic resin layer may be laminated by a co-extrusion method with other thermoplastic resin layers. Further, other plastic films may be laminated on the thermoplastic resin layer. For example, a linear low-density polyethylene (LLDPE) film as a sandwich substrate may be further laminated on the LDPE layer laminated on the polyethylene terephthalate film.

EXAMPLES

Examples of the laminate of the present invention will be described in detail below. The present invention is not limited to any of these examples.

Example 1

One side of a polyethylene terephthalate film having a thickness of 12 μm was subjected to reactive ion etching treatment using the film processing apparatus shown in FIGS. 1(a) and 1(b). The treatment was performed under the following conditions: high-frequency power supplied from an AC power source: 20 kW, frequency of high-frequency power: 40 kHz, processing intensity Epd: 437 W·s/m², and treatment gas: inert argon gas. Thereafter, a low-density polyethylene resin (LDPE) was laminated on the treated surface of the polyethylene terephthalate substrate by extrusion lamination to a thickness of 15 μm and a 60 μm-thick linear low-density polyethylene (LLDPE) film as a sandwich substrate was further laminated on the LDPE layer, thereby producing a laminate.

Example 2

A laminate was produced in the same manner as in Example 1, except that the reactive ion etching treatment was performed at a high-frequency power of 25 kW and a processing intensity Epd of 546 W·s/m².

Example 3

A laminate was produced in the same manner as in Example 1, except that the reactive ion etching treatment was performed at a high-frequency power of 35 kW and a processing intensity Epd of 765 W·s/m².

Example 4

A laminate was obtained in the same manner as in Example 1, except that a maleic anhydride-modified polyethylene resin was used in place of LDPE.

Example 5

A laminate was obtained in the same manner as in Example 1, except that a polyamide film having a thickness of 15 μm was used in place of the polyethylene terephthalate film having a thickness of 12 μm.

Comparative Example 1

A laminate was produced in the same manner as in Example 1, except that the reactive ion etching treatment was not performed.

Comparative Example 2

A laminate was obtained in the same manner as in Example 1, except that corona treatment was performed in place of the reactive ion etching treatment.

Comparative Example 3

A laminate was produced in the same manner as in Example 1, except that the reactive ion etching treatment was performed at a high-frequency power of 10 kW and a processing intensity Epd of 218 W·s/m².

Evaluation

The laminates obtained in the examples and comparative examples were evaluated in the following way. Table 1 shows the evaluation results.

[Measurement of maximum displacement and softening temperature by local thermal analysis]

The maximum displacement and softening temperature of the reactive ion-etched or corona-treated surface of the substrate were measured by local thermal analysis.

A scanning probe microscope (SPM) MFP-3D-SA produced by Oxford Instruments Co., Ltd. was used as a measurement device, and a Ztherm modulated thermal analyzer was used as an LTA option. In order to determine the maximum displacement and softening temperature, the probe was brought close to the substrate surface, and the shape was measured in a visual field of 5 μm×5 μm. Ten measurement points were determined from the obtained shape image. Next, LTA measurement was performed to measure the shape for confirming measurement marks. When a voltage was applied to the probe to heat the substrate surface, the substrate surface thermally expanded, and the probe bent and rose. Then, when the temperature reached a certain level, the substrate surface softened and the probe descended. The maximum displacement and softening temperature of the substrate surface were measured from the inflection point of the probe deflection. The contact pressure was 0.1 V and the heating rate was 0.5 V/s. The probe temperature was calibrated in advance using four types of standard samples whose softening temperatures were known. The softening temperatures of the examples and comparative examples were 257° C. (Example 1), 260° C. (Example 2), 262° C. (Example 3), 257° C. (Example 4), 248° C. (Comparative Example 1), 250° C. (Comparative Example 2), and 250° C. (Comparative Example 3).

[Laminate Strength]

The wet laminate strength between the substrate and thermoplastic resin layer of each laminate of the examples and comparative examples was measured. The measurement was performed according to JIS Z1707 using a Tensilon universal tester RTC-1250 (produced by Orientec Corporation) while wetting the measurement site with water. The measurement conditions were a sample width of 15 mm, a peeling speed of 300 m/min, and a peeling angle of 180 degrees.

[Analysis of Carbon Concentration of Peeled Surface]

After measuring the laminate strength, the carbon concentration (atomic %) of each of the peeled surface of the substrate and the peeled surface of the thermoplastic resin layer was measured by X-ray photoelectron spectroscopy (XPS). The measurement conditions were as follows: the X-ray source was non-monochromatic MgKα (1253.6 eV), and the output was 100 W (10 kV to 10 mA). A relative sensitivity factor of 2.28 for O1s and 1.00 for C1s was used for quantitative analysis. Then, the absolute value of the difference C between the carbon concentration of the peeled surface of the substrate and the carbon concentration on the peeled surface of the thermoplastic resin layer was calculated.

[Adhesion Evaluation]

After measuring the laminate strength, the peeled surface of the substrate and the peeled surface of the thermoplastic resin layer were each observed by X-ray photoelectron spectroscopy (XPS). Then, the adhesion was evaluated according to the following criteria. More specifically, among the examples, only Example 4 showed cohesive failure of the thermoplastic resin layer, and the other examples showed cohesive failure of the substrate.

Good adhesion: cohesive failure of the substrate or the thermoplastic resin layer was observed.

Poor adhesion: interfacial peeling between the substrate and the thermoplastic resin layer was observed.

TABLE 1

| | High-frequency power [kW] | Plasma intensity [W · s/m²] | Maximum displacement [nm] | Wet laminate strength [N/15 mm] | Carbon concentration difference |C| [atomic %] | Adhesion |
|---|---|---|---|---|---|---|
| Example 1 | 20 | 437 | 350 | 4.4 | 1 | Good |
| Exabmple 2 | 25 | 546 | 400 | 5.1 | 0.8 | Good |
| Example 3 | 35 | 765 | 520 | 8.4 | 0.5 | Good |
| Example 4 | 20 | 437 | 350 | 9.5 | 6.5 | Good |
| Example 5 | 20 | 437 | — | 2.9 | 1.1 | Good |
| Comparative Example 1 | — | — | 50 | 0.1 | 24.4 | Poor |
| Comparative Example 2 | — | — | 130 | 0.2 | 22.5 | Poor |
| Comparative Example 3 | 10 | 218 | 180 | 0.3 | 15.7 | Poor |

As shown in Table 1, when pretreatment was performed so that the maximum displacement of the surface of the substrate (in particular, a polyethylene terephthalate film) was 300 nm or more, improved or even excellent peel strength was exhibited. Further, when the carbon concentration difference C between the peeled surface of the substrate and the peeled surface of the thermoplastic resin layer was a predetermined value, improved or even excellent adhesion was exhibited. This is presumed to be due to the fact that the plastic film and the thermoplastic resin layer, which were difficult to firmly bond, were firmly bonded to each other, thereby suppressing interfacial peeling between them. As a result, it is considered that a laminate having improved or even excellent mechanical properties was obtained.

INDUSTRIAL APPLICABILITY

The laminate of the present invention has improved or even excellent filling and packaging suitability, storage suitability, protection suitability, etc., for foods and drinks, pharmaceuticals, electronic device components, and the like.

REFERENCE SIGNS LIST

1 . . . Film processing apparatus; 2 . . . Box; 3 . . . First discharge electrode unit; 3*a*, 4*a* . . . Electrode; 3*b*, 4*b* . . . Magnet; 4 . . . Second discharge electrode unit; 5 . . . AC power source; F . . . Film; P . . . Plasma; G . . . Magnetic field.

What is claimed is:

1. A method for producing a laminate, comprising the steps of:
    a pretreatment step of pretreating a surface of a substrate made of a plastic film by reactive ion etching so that a maximum displacement of the surface of the substrate measured by local thermal analysis is 300 nm or more, and
    a lamination step of laminating a thermoplastic resin layer made of a material different from that of the substrate on the pretreated surface of the substrate;
    wherein the plastic film is a polyethylene terephthalate film, wherein the ion etching is performed at a plasma processing intensity in a range of 400 [W·s/m$^2$] or more and 900 [W·s/m$^2$] or less.

2. The method of claim 1, wherein the pretreatment step is performed so that a softening temperature of the surface of the substrate measured by local thermal analysis is 250° C. or higher.

3. The method of claim 1, wherein when the substrate and the thermoplastic resin layer in the laminate are peeled in a wet state, a difference C between a carbon concentration of a peeled surface of the substrate and a carbon concentration of a peeled surface of the thermoplastic resin layer after peeling satisfies the following formula (A) in measurement by X-ray photoelectron spectroscopy (XPS):

$$0 \leq |C| \leq 10 \text{ (atomic \%)} \qquad \text{Formula (A)}.$$

* * * * *